No. 780,144. PATENTED JAN. 17, 1905.
J. R. VAN WINKLE.
CUTTING MECHANISM.
APPLICATION FILED APR. 7, 1904.
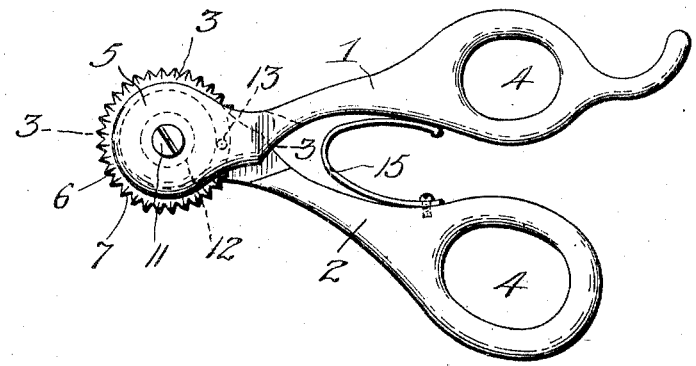
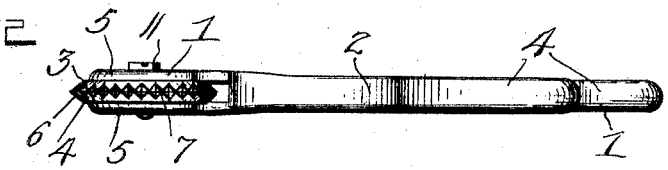
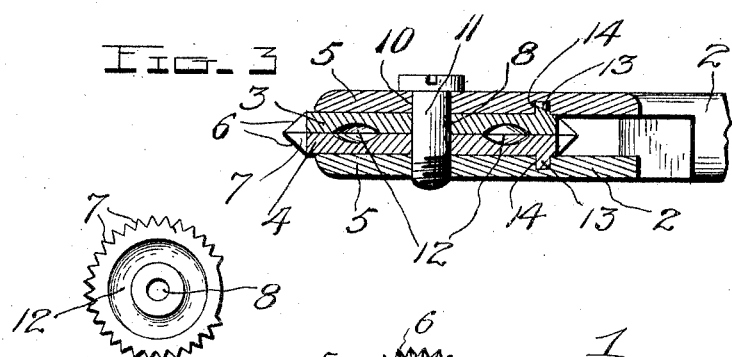
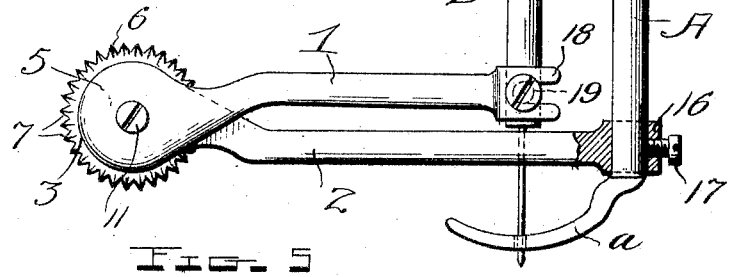
Witnesses
Inventor
J. R. Van Winkle
By H. B. Wilson
Attorney No. 780,144.

Patented January 17, 1905.

UNITED STATES PATENT OFFICE.

JOHN R. VAN WINKLE, OF SUMPTER, OREGON.

CUTTING MECHANISM.

SPECIFICATION forming part of Letters Patent No. 780,144, dated January 17, 1905.

Application filed April 7, 1904. Serial No. 202,114.

*To all whom it may concern:*

Be it known that I, JOHN R. VAN WINKLE, a citizen of the United States, residing at Sumpter, in the county of Baker and State of Oregon, have invented certain new and useful Improvements in Cutting Mechanism; and I do declare the following to be a full, clear, and exact description of the invention, such as will enable others skilled in the art to which it appertains to make and use the same.

My invention relates to improvements in cutting mechanisms, and more particularly to devices of this character by means of which sewed seams on fabric may be quickly and easily ripped without danger of cutting or injuring the fabric.

The object of my invention is to provide a cutting or ripping mechanism of this character which will be simple in construction, durable in use, very efficient in operation, and comparatively inexpensive to produce.

With this and other objects in view the invention consists of certain novel features of construction, combination, and arrangement of parts, as will be more fully described, and particularly pointed out in the appended claims.

In the accompanying drawings, Figure 1 is a side elevation of a device embodying my invention, the same being in the form of a pair of shears or scissors. Fig. 2 is an edge view of the same. Fig. 3 is a longitudinal sectional view taken on the line 3 3 of Fig. 1. Fig. 4 is an inner face view of one of the cutters. Fig. 5 is a side elevation of another embodiment of my invention, the same being in the form of an attachment for a sewing-machine.

Referring more particularly to Figs. 1 to 4, inclusive, of the drawings, the numerals 1 and 2 denote two pivotally-connected members or levers which have at their pivoted ends coacting cutters 3 and at their opposite or free ends thumb and finger loops or eyes 4, similar to the handles of a pair of shears or scissors. Said cutters 3 may be formed integral with the circular pivoted ends 5 of said members; but they are preferably made detachable, as illustrated. Each cutter is in the form of a circular disk, preferably of hardened steel, having a beveled edge 6, which is notched or toothed, as shown at 7. In the center of each of the cutter-disks is an opening 8, through which and through similar openings 10, formed in the said ends 5, a screw, bolt, or rivet 11 is passed to secure said cutter-disks between said ends and to pivotally connect the members or levers 1 and 2. Said cutter-disks, it will be seen, are placed together with their beveled edges or faces outwardly, and in order to reduce friction between the inner faces of said disks and also to permit them to be more easily sharpened said inner contacting faces are formed with circular concentric depressions or recesses 12, as shown. The outer faces of the cutter-disks bear against the inner recessed faces of the ends 5, and in order to connect said disks to said ends to prevent slipping and to permit them to be easily attached and detached when the pivot 11 is removed I provide upon the said outer faces of the cutter-disks a small stud 13, which enters a recess 14, formed in the inner face of the end 5, as clearly shown in Fig. 3. If desired, the members or levers may be opened automatically by a spring, which may be of any suitable form and applied in any desired manner. In the drawings a bow-spring 15 is shown attached to one and engaging the other of the members or levers in order to force them apart.

The operation of the device will be readily seen. When the free or handle ends of the levers 1 and 2 are moved toward and from each other, the cutter-disks will be simultaneously oscillated, so that the teeth on each of them will be moved across the spaces between the teeth on the other. When the device thus operated is moved along a seam, the thread or stitching of the seam will be engaged by said teeth and quickly cut or severed, as will be readily understood. Owing to the peculiar construction and operation of the cutter, the danger of cutting or otherwise damaging the goods or fabric is almost entirely overcome and there is but little liability of the operator cutting his fingers or hands.

In Fig. 5 I have illustrated my invention embodied in an attachment for a sewing-machine. This device is very similar to that just described, the only differences being the omission of the spring 15 and the provision of means for attaching the levers 1 and 2 to the presser-foot post and needle-post of a sewing-machine. Either one of said levers is rigidly attached to the post A of the presser-foot *a* by any suitable means, preferably by forming the end of said lever with a tubular head or bearing 16, through which said post projects, and by providing said head 16 with a set-screw 17 to engage said post, and thus rigidly attach the lever. The other of said levers has a loose pivotal connection with the reciprocating needle-post B, which connection is preferably effected by forming said lever with a slotted or bifurcated end 18, which loosely engages a pivot-screw 19, carried by the reciprocating needle-post B, as shown. It will be seen that when the sewing-machine is operated the reciprocation of the needle-post B will oscillate the lever loosely connected to it, and thus oscillate its cutter-disk upon the similar cutter-disk carried by the other lever.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A cutting or ripping mechanism comprising pivotally-connected members, and coacting cutter-disks upon said members, said disks being disposed concentrically with the pivot of said levers whereby they will be oscillated upon each other when said members are operated, substantially as described.

2. A cutting or ripping mechanism comprising pivotally-connected members, and coacting beveled, toothed cutter-disks upon said members, said disks being disposed concentrically with the pivot of said levers whereby they will be oscillated upon each other when said members are operated, substantially as described.

3. A cutting or ripping mechanism comprising two members or levers, a toothed cutter-disk upon each of said levers, a pivot passed concentrically through said disks and through said levers to pivotally connect the latter and to hold the former in contact with each other, and means for holding said levers apart, substantially as described.

4. A cutting or ripping mechanism comprising two levers, toothed cutter-disks detachably connected to the ends of said levers, and a pivot passed through said levers and concentrically through said disks to pivotally connect said levers and to hold said disks in contact with each other and between said levers, substantially as described.

5. A cutting or ripping mechanism comprising two levers, toothed cutter-disks detachably connected to the ends of said levers, a pivot passed through said levers and concentrically through said disks to pivotally connect said levers and to hold said disks in contact with each other and between said levers, and a spring for forcing said levers apart, substantially as described.

6. A cutting or ripping mechanism comprising two levers having pivot-openings adjacent to their ends and recesses adjacent to said pivot-openings, cutter-disks having studs to enter said recesses and detachably connect said disks to said levers, and a pivot passed concentrically through said disks and through said pivot-openings in said levers to pivotally connect said levers and to hold said disks in contact with each other and between said levers.

7. A cutting or ripping mechanism comprising two levers having pivot-openings adjacent to their ends and recesses adjacent to said pivot-openings, cutter-disks having studs to enter said recesses and detachably connect said disks to said levers, a pivot passed concentrically through said disks and through said pivot-openings in said levers to pivotally connect said levers and to hold said disks in contact with each other and between said levers, and a spring for forcing said levers apart, substantially as described.

8. A cutting or ripping attachment for sewing-machines comprising pivotally-connected levers, cutter-disks upon said levers disposed concentrically with their pivot, means for rigidly securing one of said levers to the presser-foot post of a sewing-machine, and means for loosely and pivotally connecting the other of said levers to the reciprocatory needle-post of said sewing-machine, substantially as described.

In testimony whereof I have hereunto set my hand in presence of two subscribing witnesses.

JOHN R. VAN WINKLE.

Witnesses:
S. S. START,
H. B. WOLKING.